Jan. 30, 1940. J. E. KRILOW 2,188,362
CORING UTENSIL
Filed April 23, 1938
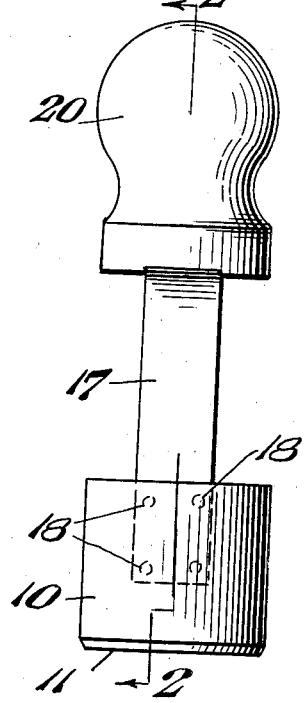
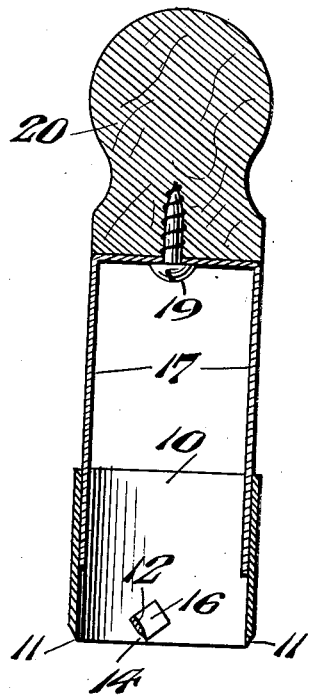
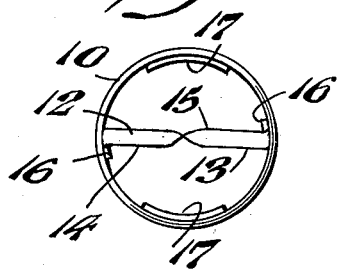
INVENTOR
JAMES E. KRILOW.
BY
Robert M. Baer
ATTORNEY Patented Jan. 30, 1940

2,188,362

UNITED STATES PATENT OFFICE 2,188,362

CORING UTENSIL

James E. Krilow, Atlantic City, N. J.

Application April 23, 1938, Serial No. 203,755

2 Claims. (Cl. 30—25)

The present invention relates to a coring utensil for use upon fruits, vegetables, and the like to remove cores, pulp, fibers and seed sacs in the preparation of the article for table use.

Utensils for this purpose as heretofore employed range from knives with either straight or curved blades to tubular members having an annular cutting edge but all of these prior devices have objectionable features. Thus knives are slow, require a large number of separate hand operations, and always more or less waste of juice and meat, while the tubular members merely bore out a circular plug which remains attached to the rind until cut away with an ordinary knife. In some instances it has been proposed to equip a tubular member with a transversely disposed knife (such as shown in Patent No. 1,568,008) but without solving the problem or meeting with the success anticipated. In the patent mentioned the blade has no cutting action except axially of the fruit and any turning of the body tends to drag the blade against the meat and pulp to create such resistance as makes hand manipulation extremely arduous.

Some of the objects of the present invention are to provide an improved utensil for preparing fruits and vegetables for table use; to provide a novel hand operated utensil for removing pulp, cores, seeds, and seed sacs from grapefruit, oranges, apples, tomatoes, peppers, pineapples, and any other edible article; to provide a coring utensil wherein provision is made for simultaneously cutting axially and transversely of a natural product to remove inedible parts; to provide a coring utensil having cutting blades so arranged and disposed as to cut laterally with respect to an axial movement of said utensil; and to provide other improvements as will hereinafter appear.

In the accompanying drawings Fig. 1 represents a side elevation of a coring utensil embodying one form of the present invention; Fig. 2 represents a section on line 2—2 of Fig. 1; and Fig. 3 represents a bottom plan of the utensil.

Referring to the drawings one form of the present invention consists of a tubular body 10, preferably of cylindrical shape, which forms the main coring or extracting head. One end of this body 10 is ground or otherwise formed into a cutting edge or circular knife 11, the function of which is to cut a circular path through which the head advances, thereby separating a central plug or mass of core fiber from the encircling meat or edible portion of the fruit. Unless the central mass is transversely cut it still remains attached to the rind of the fruit when the body 10 is removed, and it is one object of the present invention to neatly and effectively detach this circumscribed mass. To that end a strip of metal is provided having a twist between its ends to thereby form two blades 12 and 13 which terminate respectively in oppositely disposed severing edges 14 and 15. The strip formed by the blades 12 and 13 is preferably mounted diametrically across the body 10 in such a position that the plane of the edges 14 and 15 is substantially coincident with the plane of the knife 11. The invention, however, is not restricted to this precise location since the blades 12 and 13 can be otherwise arranged relative to the knife 11 with good results. The strip, as here shown, is secured rigidly in place by bending its ends 16 flush with the inner wall of the body 10 and there spot welded as the preferred anchoring means. In connection with the twisting of the strip, it should be noted that the twist is preferably such that the blade 12 is set at an angle of approximately ninety degrees to the blade 13 thereby making it possible to give the aforesaid blades a pitch of approximately forty-five degrees to a vertical plane when the strip is properly fixed in its operating position within the body 10. Thus by rotating the body 10 on half of a revolution the edges 14 and 15 will each sweep a path of one hundred and eighty degrees about the axis of the body 10. The combined sweep of the aforesaid edges includes the entire area bounded by the wall of the body 10 and thereby completely severs all attached parts of the cylindrical plug which has been separated by the knife 11.

For operating the body or head 10, a U-shaped frame is provided having legs 17 entering the body 10 at opposite sides where each is fastened in place by spot welding 18 or any other suitable means. The bridge portion of the said frame is secured by a screw 19 to a handle 20 which is so shaped as to be readily grasped by the hand in order that the required pressure can be easily applied. When the fruit or other product has a depth greater than the length of the head 10 the core or other mass being detached will protrude into the space framed by the legs 17 and can thus be removed.

It will now be apparent that a complete unitary coring utensil has been devised which is simple, compact, economical to manufacture, and particularly efficient in use. Attention is directed to the ingenious arrangement of the two angularly disposed blades 12 and 13 since these contribute in a large measure to the successful result here attained. Thus a turning of the body 10 in the proper direction causes the two cutting edges 14 and 15 to function simultaneously and in consequence the resistance encountered by a flat blade facing the material is entirely eliminated.

Hence in operation the knife 11 cuts a circular path of the fruit as it is pressed inwardly while the angularly disposed blades 12 and 13 also cut diametrically of the head. If now the head or body 10 is rotated or oscillated these blades 12 and 13 will not only cut the core parts laterally within the knife 11 but when such blades reach the limit of movement as determined by the rind of the fruit will sever all such parts from the rind.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A coring utensil comprising the combination of a tubular head having a cutting knife at one end, a metal strip extending transversely within said head and twisted to form two oppositely disposed cutting blades arranged at substantially forty-five degrees to the axis of said head, and means to anchor the ends of said strip to said head.

2. A coring utensil comprising the combination of a tubular head having a cutting knife at one end, a metal strip extending transversely within said head and twisted to form two oppositely disposed cutting blades arranged to cut transversely to the axis of said head to sever the core from the body of the article, and means to anchor the said ends of said strip to said head.

JAMES E. KRILOW.